(12) United States Patent
Piper et al.

(10) Patent No.: US 10,514,071 B2
(45) Date of Patent: Dec. 24, 2019

(54) TORQUE TRANSMITTING ASSEMBLY (71) Applicant: METAL FORMING & COINING CORPORATION, Maumee, OH (US)

(72) Inventors: Erik Piper, Clinton Township, MI (US); Timothy J. Cripsey, Rochester, MI (US)

(73) Assignee: METAL FORMING & COINING CORPORATION, Maumee, OH (US)

(*) Notice: Subject to any disclaimer, the term of this patent is extended or adjusted under 35 U.S.C. 154(b) by 318 days.

(21) Appl. No.: 15/438,103

(22) Filed: Feb. 21, 2017

(65) Prior Publication Data

US 2017/0241485 A1 Aug. 24, 2017

Related U.S. Application Data (60) Provisional application No. 62/296,917, filed on Feb. 18, 2016.

(51) Int. Cl.
*F16D 11/14* (2006.01)
*F16D 1/116* (2006.01)
*F16D 1/10* (2006.01)

(52) U.S. Cl.
CPC .............. *F16D 11/14* (2013.01); *F16D 1/116* (2013.01); *F16D 2001/103* (2013.01)

(58) Field of Classification Search
CPC ..... F16D 1/116; F16D 11/14; F16D 2001/103
See application file for complete search history.

(56) References Cited

U.S. PATENT DOCUMENTS

| 4,382,495 A * | 5/1983 | Fleitas | B60K 17/3515 180/247 |
|---|---|---|---|
| 7,021,171 B2 | 4/2006 | Huber et al. | |
| 7,328,492 B2 | 2/2008 | Huber et al. | |
| 8,167,762 B2 * | 5/2012 | Zink | B60T 8/171 475/230 |
| 2003/0130085 A1 | 7/2003 | Matsuo et al. | |
| 2004/0134740 A1 | 7/2004 | Gerathewohl et al. | |
| 2011/0185782 A1 | 8/2011 | Cripsey et al. | |
| 2013/0174407 A1 | 7/2013 | Dziurda | |
| 2014/0102846 A1 | 4/2014 | Raber et al. | |
| 2014/0246286 A1 | 9/2014 | Luipold et al. | |
| 2016/0356341 A1 * | 12/2016 | Flemming | F16D 28/00 |

FOREIGN PATENT DOCUMENTS

| CN | 1818428 A | 8/2006 |
|---|---|---|
| EP | 1217262 A2 | 6/2002 |

* cited by examiner

*Primary Examiner* — Huan Le
(74) *Attorney, Agent, or Firm* — Shumaker, Loop & Kendrick, LLP; James D. Miller (57) ABSTRACT

A torque transmitting assembly including a first drum having a plurality of teeth formed at an end thereof. A gear assembly axially aligns with the first drum and has a plurality of teeth intermeshing with the plurality of teeth of the drum. The gear assembly includes an annular gear and a plate axially aligning with the gear.

13 Claims, 10 Drawing Sheets

TORQUE TRANSMITTING ASSEMBLY

CROSS-REFERENCE TO RELATED PATENT APPLICATION

This patent application claims the benefit of U.S. Provisional Patent Application Ser. No. 62/296,917, filed on Feb. 18, 2016. The entire disclosure of the above patent application is hereby incorporated herein by reference.

FIELD

The present invention relates to a torque transmitting assembly and more particularly to an assembly for transmitting torque between a drum and a gear.

BACKGROUND OF THE INVENTION

In automatic transmission systems, torque is transmitted from component to component within the transmission by a torque transmitting assembly. Frequently, torque transmitting assemblies are of complex design, permitting them to serve several functions and reduce the number of components in the transmission system. In such a case, the materials from which the torque transmitting assembly is made is usually selected to accommodate the greatest stresses applied to this complex torque transmitting assembly. A large portion of the torque transmitting assembly is typically stronger and heavier than is really necessary for the application.

In order to reduce weight, aluminum is used in place of steel where possible. Aluminum is not an appropriate material for such components as annulus gears, but it can be used for drive shells or drums which transmit the torque between annulus gears and other supporting or torque-controlling structures within the transmission. The drums are can be formed from a flow forming process. An example of such an assembly and method of forming is shown and described in U.S. Pat. Nos. 7,021,171 and 7,328,492, the disclosures of which are hereby incorporated herein by reference in their entirety.

However, this is a continual need to minimize a weight, a cost, and complexity of the torque transmitting assemblies. Additionally, it is desired to maximize a rigidity and an efficiency of the torque transmitting assembly with enhanced interlocking and coupling of the components.

SUMMARY OF THE INVENTION

In accordance and attuned with the present invention, an improved torque transmitting assembly that minimizes a weight, a cost and complexity thereof, maximizes a rigidity and an efficiency thereof, and includes enhanced interlocking and coupling of components has surprising been discovered.

According to an embodiment of the disclosure, a torque transmitting assembly is disclosed. The torque transmitting assembly includes a first drum having a plurality of teeth formed at an end thereof. A gear assembly axially aligns with the first drum and has a plurality of teeth intermeshing with the plurality of teeth of the drum. The gear assembly includes an annular gear and a plate axially aligning with the gear.

According to another embodiment of the disclosure, a torque transmitting assembly is disclosed. The torque transmitting assembly includes a first drum having a plurality of splines formed on an inner surface intermediate a first end and a second end thereof and one of a flange and a plurality of teeth formed at the first end thereof. A gear assembly is coupled to the first end of the drum and engages the one of the flange and the plurality of teeth of the first drum. The gear assembly includes a second drum receiving an annular gear and a plate axially aligning with the gear.

According to a further embodiment of the disclosure, a torque transmitting assembly is disclosed. The torque transmitting assembly includes an aluminum drum having a plurality of teeth formed at an end thereof. A gear assembly axially aligns with the drum and is coupled to the end of the drum. The gear assembly includes a steel drum, an annular steel gear, and a steel plate. The steel drum has a plurality of teeth intermeshing with the plurality of teeth of the aluminum drum and a plurality of splines formed on an inner surface thereof. The steel gear has a plurality of splines formed on an outer surface thereof engaging the plurality of splines of the steel drum. The plate engaging at least one of an inner surface of the steel gear and an inner surface of the steel drum.

BRIEF DESCRIPTION OF THE DRAWINGS

The above advantages of the invention will become readily apparent to those skilled in the art from reading the following detailed description of an embodiment of the invention in the light of the accompanying drawings, in which.

DETAILED DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner.

Figure 1:
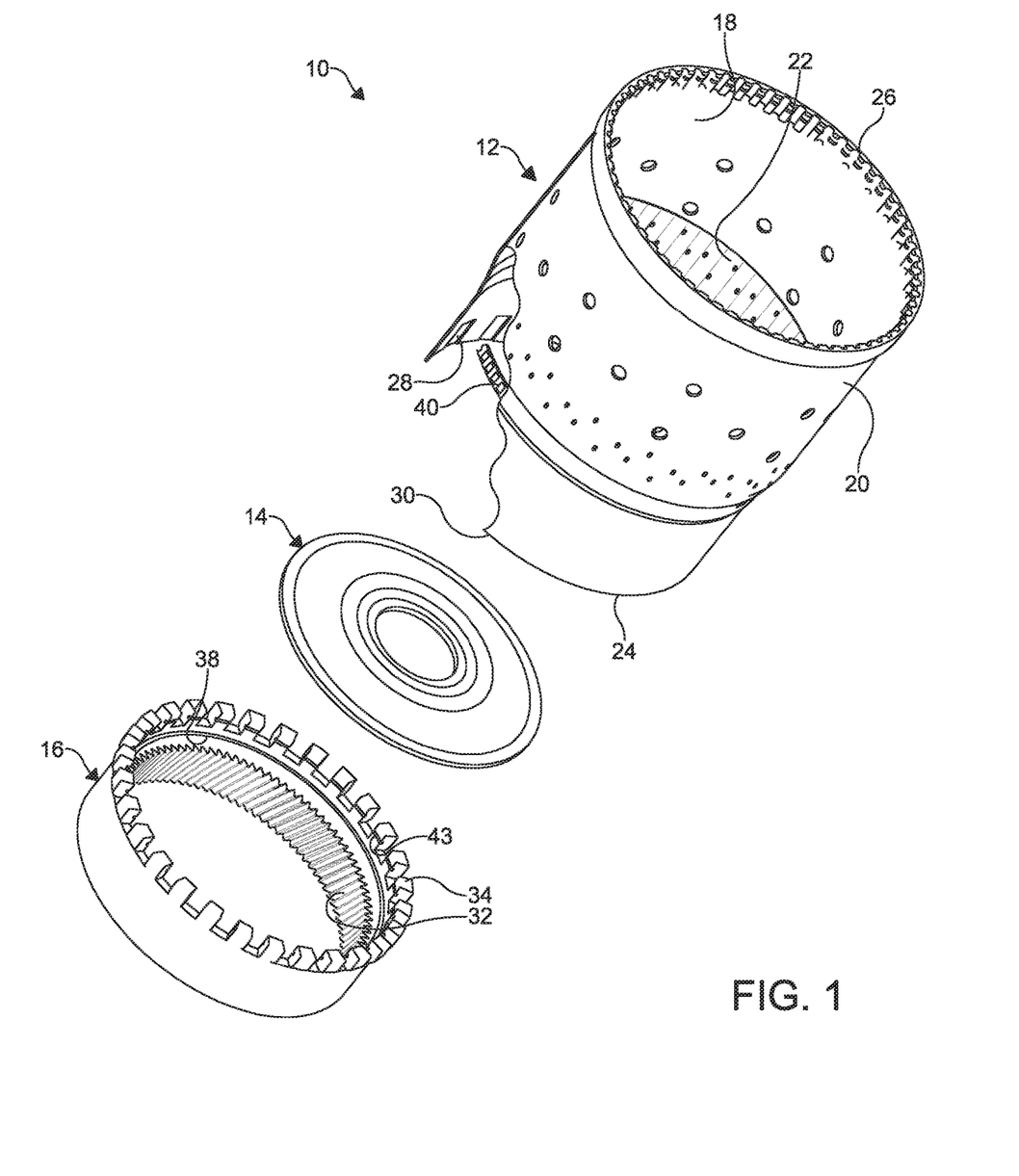
FIG. 1 is an exploded perspective view of a torque transmitting assembly according to an embodiment of the disclosure with a portion of a drum of the torque transmitting partially cut away.
Figure 2:
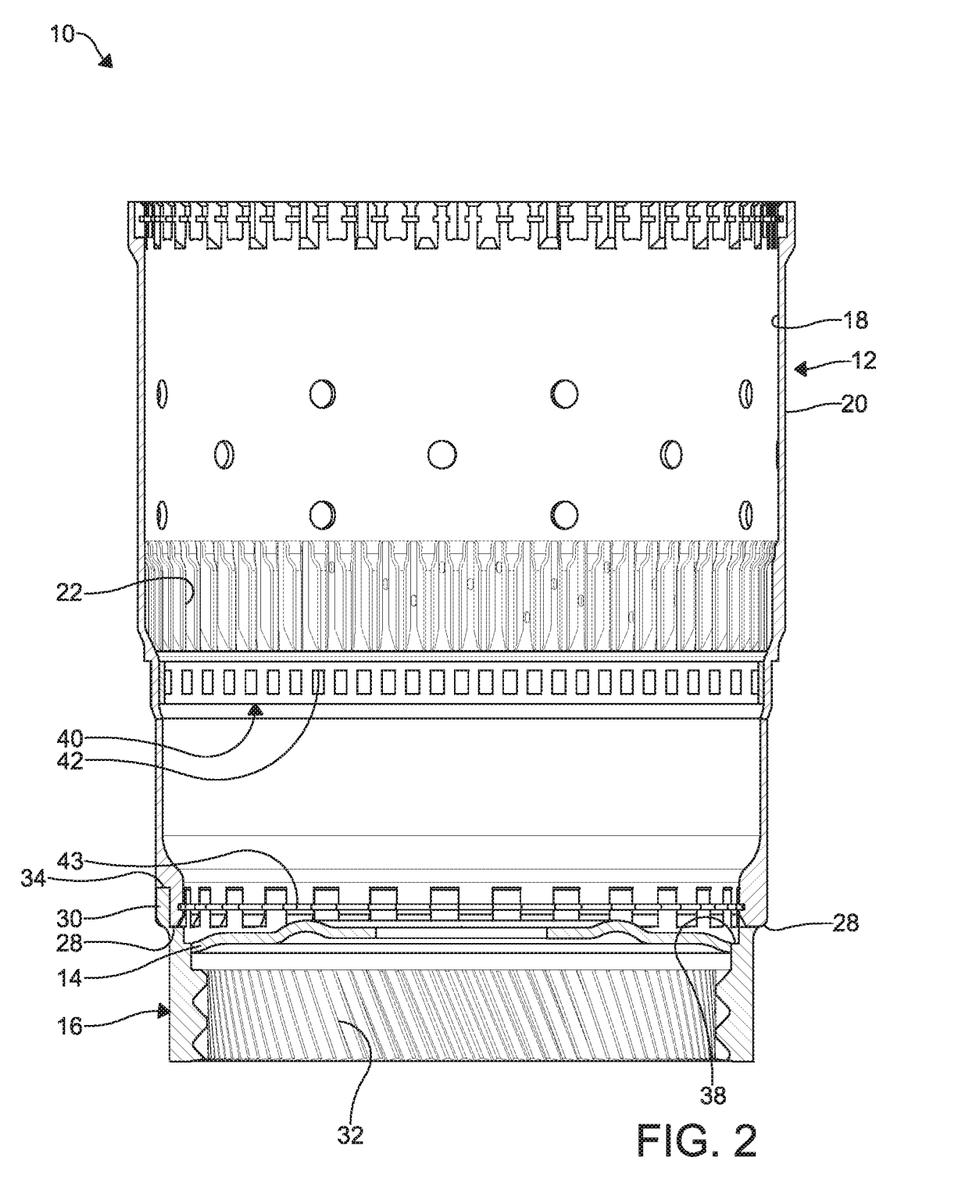
FIG. 2 is an assembled cross-sectional view of the torque transmitting assembly according to FIG. 1.

FIGS. 1 and 2 illustrate a torque transmitting assembly 10 according to an embodiment of the disclosure. The torque transmitting assembly 10 is configured to provide torque between a driving member (not shown) and a driven member (not shown). The torque transmitting assembly 10 includes a drum 12 for engagement with the driving member or the driven member, a plate 14, and an annular gear 16 for engagement with the other one of the driving member or the driven member axially aligning with the drum 12 and the plate 14.

The drum 12 is tubular and includes an inner surface 18 and an outer surface 20. The drum 12 is formed by a flow form process such disclosed in U.S. Pat. Nos. 7,021,171 and 7,328,492, the disclosures of which are hereby enclosed herein by reference in their entirety. However, it is understood the drum 12 can be formed by other known processes, if desired. It is advantageous for the drum 12 to be formed from aluminum, however, it should be understood other materials, such as steel, can be used to form the drum 12. The inner surface 18 of the drum 12 has an array of splines 22 formed thereon intermediate a first end 24 and a second end 26 of the drum 12. The first end 24 of the drum 12 includes a rim 30 having an annular formation of teeth 28. The teeth 28 are defined by a plurality of substantially rectangular shaped recesses formed on the inner surface 18 of the drum 12. It is understood, the recesses can be any shape such as triangular or arcuate, for example, and can extend axially outwardly from the rim 30.

The gear 16 is typically formed from a steel stock material including internally formed splines 32 which extend radially inwardly of an inner surface of the gear 16. Although, it should be understood the gear 16 can be formed from other materials, if desired. The gear 16 further includes an annular array of teeth 34 extending outwardly from an end thereof. The teeth 34 of the gear 16 engage and intermesh with the teeth 28 of the drum 12 to form a castle joint connection therebetween. It should be understood, while not shown, the teeth 34 of the gear 16 can be recesses formed on an inner surface thereof to engage teeth outwardly extending from the rim 30 of the drum 12.

An annular shoulder 38 intermediate the teeth 34 of the gear 16 and the splines 32 of the gear 16 is formed on the inner surface of the gear 16. The plate 14 is positioned adjacent the shoulder 38, as shown in the embodiment, or the plate 14 can be positioned on the shoulder 38, wherein the shoulder 38 receives the outer circumferential edge of the plate 14. The plate 14 is advantageously formed from steel and is a circular disc. Although, the plate 14 can be formed from other suitable materials with similar strength properties, if desired. The gear 16 and the plate 14 form a gear assembly.

A sensor component 40 is annularly disposed on the inner surface 18 of the drum 12.

In the embodiment illustrated, the sensor component 40 has annularly disposed windows 42 and is a steel ring. The ring can be formed from any known process such as stamping, roll forming, extrusion forming, or any other known forming process. The sensor component 40 is advantageously positioned and captured on the inner surface 18 of the drum 12 as the aluminum stock forming the drum 12 is being formed by the flow forming process. However, it is understood the sensor component 40 can be disposed on the inner surface 18 of the drum 12 by other known processes or assembly steps during or after the step of forming of the drum 12. The sensor component 40 facilitates acquiring, obtaining, and calculating certain parameters by a sensor. Advantageously, in the non-limiting example where the sensor component 40 is steel and the drum 12 is aluminum, the aluminum of the drum 12 in exposed through the windows 42. As a result the sensor is able to calculate rotational parameters of the torque transmitting assembly 10 by counting or "reading" the aluminum exposed through the windows 42 alternating with the steel of the sensor component 40.

To assemble the torque transmitting assembly 10, the parts (the drum 12, the plate 14, the gear 16, and the sensor component 40) are formed by their respective desired processes. The plate 14 is positioned within the shoulder 38 of the gear 16 and is coupled to the gear 16 by a weld, for example. Although, other coupling means can be employed to couple the plate 14 to the gear 16, if desired, such as a friction fit, pins, screws, a cam style fit, or any other coupling means now known or later developed. The drum 12 is coupled to the gear 16 by the castle joint or intermeshing of the teeth 28, 34. A groove 43 is formed along an inner surface of the intermeshed teeth 28, 34 for receiving a snap ring to facilitate retaining the drum 12 to the gear 16.

Advantageously, the torque transmitting assembly 10 according the above-referenced embodiment minimizes the quantity of aluminum and manufacturing costs. The minimization of manufacturing costs is realized by the configuration of the sensor component 40. The intermeshing of the teeth 28, 34 permits an elimination of splines or teeth formed on the outer diameter of the gear 16. Additionally, the elimination of the teeth or splines on the outer diameter of the gear 16 permits flexing of the gear 16 while minimizing wear on the gear 16.

Figure 3:
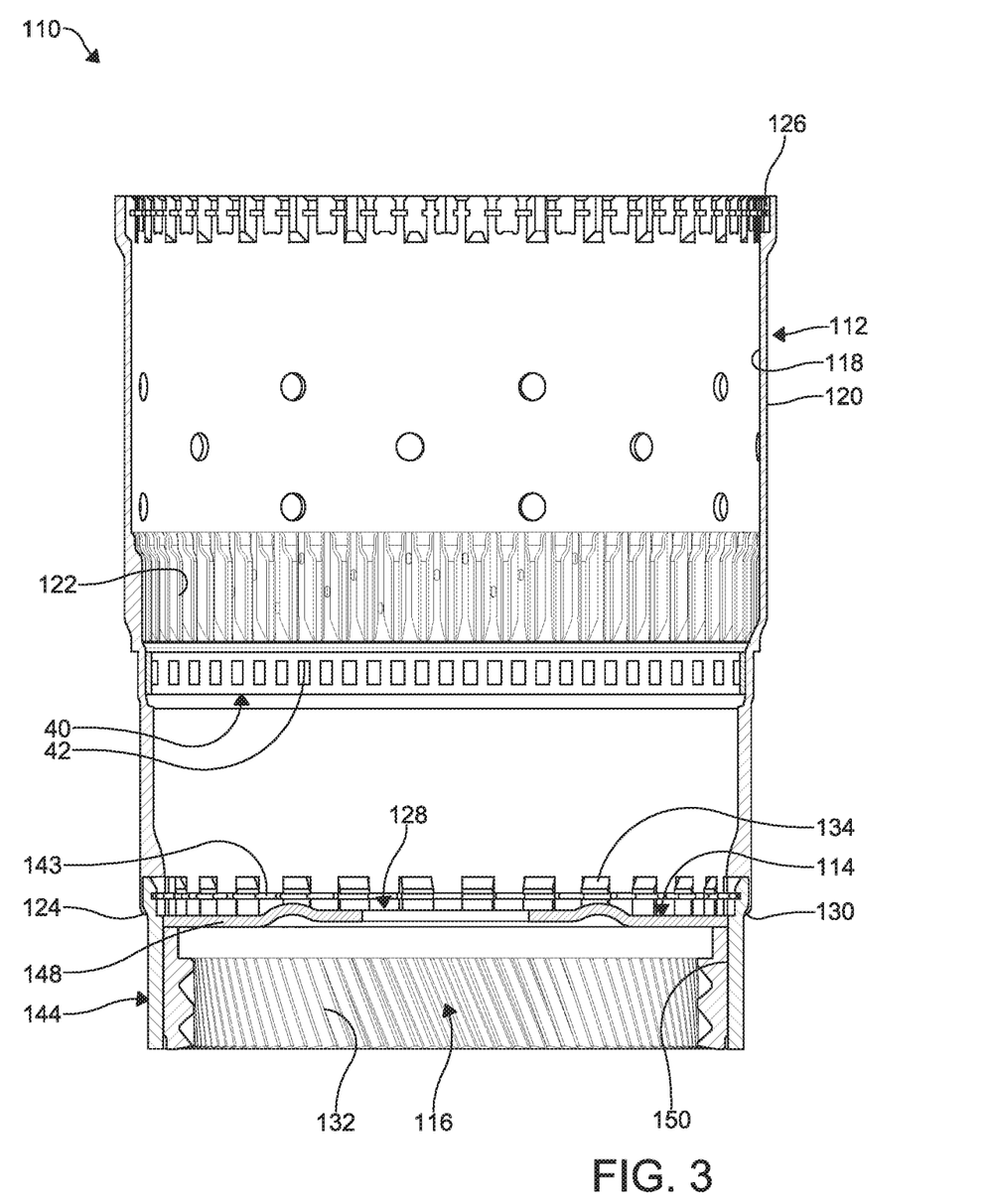
FIG. 3 is an assembled cross-sectional view of a torque transmitting assembly according to another embodiment of the disclosure.
Figure 4:
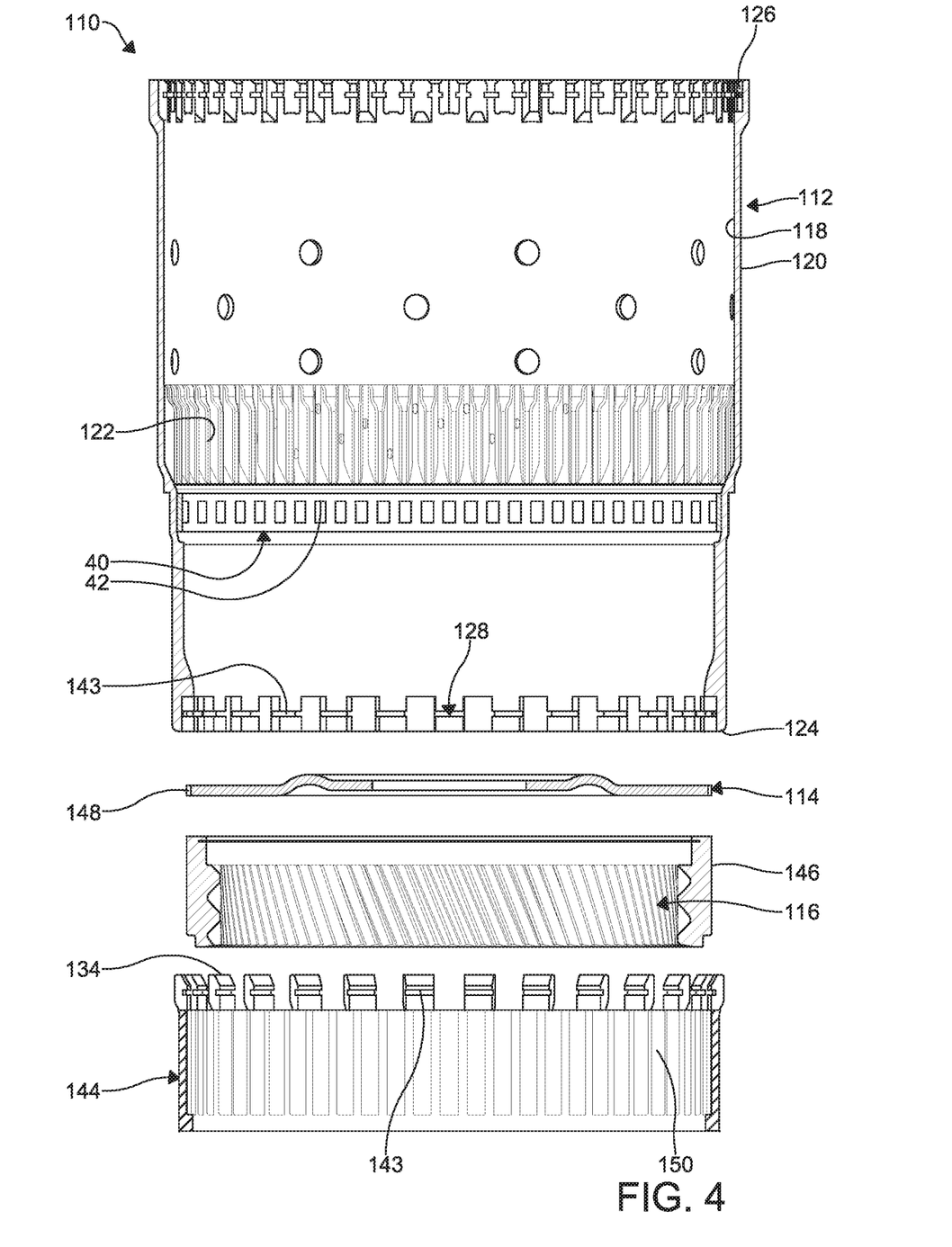
FIG. 4 is an exploded cross-sectional view of the torque transmitting assembly according to FIG. 3.

FIGS. 3-4 illustrate a torque transmitting assembly 110 according to another embodiment of the disclosure. Features similar to the torque transmitting assembly 10 of FIGS. 1-2 are annotated with the same reference numeral but with a leading "1". The torque transmitting assembly 110 of FIGS. 3-4 is substantially similar to the torque transmitting assembly 10 of FIGS. 1-2 except the torque transmitting assembly 110 includes a secondary drum 144, the gear 116 includes an array of outwardly extending splines 146 formed on an outer surface of the gear 116, and an array of outwardly extending splines 148 formed on the outer circumference of the plate 114.

The secondary drum 144 is annular and advantageously formed from steel by any known process such as flow forming, roll forming, stamping, and extrusion, for example. However, it is understood other materials can be employed to form the secondary drum 144, if desired. An array of inwardly extending splines 150 are formed on an inner surface of the secondary drum 144 to engage and intermesh with the splines 146 formed on the outer surface of the gear 116 and the splines 148 of the plate 114. According to the embodiment illustrated in FIGS. 3-4, the secondary drum 144 includes the teeth 134 intermeshing with the teeth 128 of the drum 112, rather than the gear 116. While, not illustrated, it is understood the sensor component 140 can be included, if desired. The secondary drum 144, the gear 116, and the plate 114 form the gear assembly.

It is understood, the teeth 128 of the drum 112 can extend outwardly from the first end 124 of the drum 112 with respect to an axial direction thereof rather than formed by recesses on the inner surface 118 of the drum 112. According to this non-limiting example, the groove 143 can be formed in the teeth 126 of the drum 112 and the teeth 134 of the secondary drum 144 for receiving a snap ring. It is also understood, according to certain embodiments, the secondary drum 144 can be received about the first end 124 of the drum 112 about the outer surface 120 of the drum 112. According to this embodiment, the drum 112 includes the teeth 128 formed at the first end 124 in the outer surface 120 of the drum 112. The teeth 134 of the secondary drum 144 intermesh with the teeth 128 formed on the outer surface 120 of the drum 112. It is understood, the teeth 128, 134 can intermesh according to other structural configuration as desired without departing from the scope of the disclosure.

To assemble the torque transmitting assembly 110, the parts (the drum 112, the plate 114, the gear 116, and the secondary drum 144) are formed by their respective processes. The plate 114 has an outer diameter substantially equal to an outer diameter of the gear 116. The plate 114 is positioned on the gear 116, wherein the splines 148 of the plate 114 align with the splines 146 of the gear 116 in an axial direction. The plate 114 and the gear 116 are received in the secondary drum 144. The respective splines 146, 148 of the gear 116 and the plate 114 engage with and intermesh with the splines 150 formed on the inner surface of the secondary drum 144. The drum 112 is coupled to the secondary drum 144 by the castle joint or intermeshing of the teeth 128, 134. The castle joint is formed adjacent or proximate to the plate 114 and the gear 116. As a result, the plate 114 is retained and clamped between the gear 116 and the rim 30 of the drum 112. The groove 143 is formed along the inner surface of the intermeshed teeth 128, 134 for receiving a snap ring to facilitate retaining the drum 112 to the secondary drum 144.

Advantageously, the torque transmitting assembly 110 according the above-referenced embodiment eliminates the requirement to weld the plate 114 to the gear 116. The secondary drum 144 formed from steel facilitates maximized strength in engaging the gear 116. Additionally, the torque transmitting assembly 110 facilitates desired compliance and flexing of the gear 116 while minimizing wear.

Figure 5:
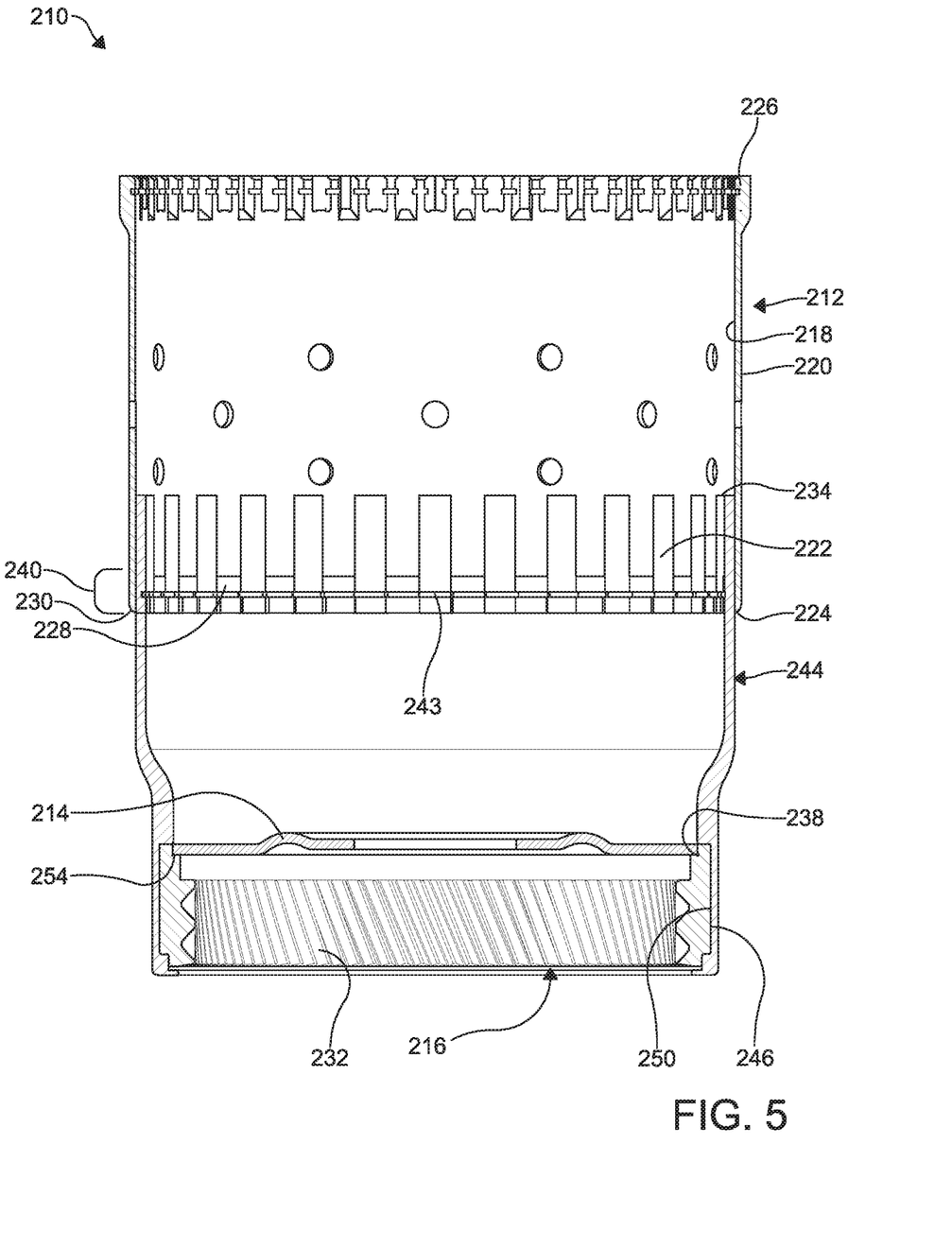
FIG. 5 is an assembled cross-sectional view of a torque transmitting assembly according to another embodiment of the disclosure.
Figure 6:
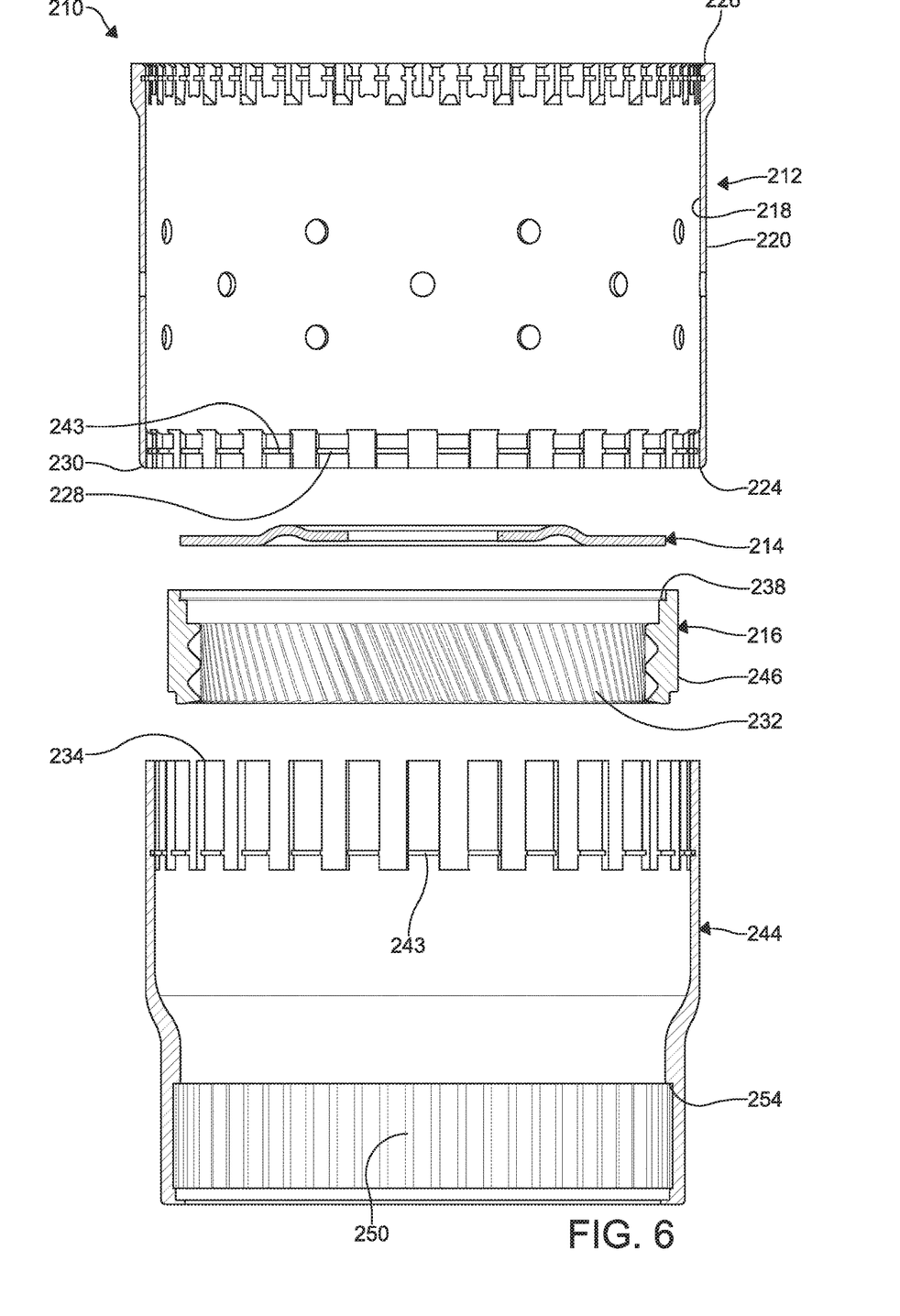
FIG. 6 is an exploded cross-sectional view of the torque transmitting assembly according to FIG. 5.

FIGS. 5-6 illustrate a torque transmitting assembly 210 according to another embodiment of the disclosure. Features similar to the torque transmitting assemblies 10, 110 of FIGS. 1-4 are annotated with the same reference numeral but with a leading "2". The torque transmitting assembly 210 of FIGS. 5-6 is substantially similar to the torque transmitting assembly 110 of FIGS. 3-4 including the secondary drum 244. However, the castle joint or intermeshing of the teeth 228 of the drum 212 and the teeth 234 of the secondary drum 244 form the sensor component 240. When intermeshed, the teeth 228 of the drum 212 formed from aluminum alternate with the teeth 234 of the secondary drum 244 formed from steel. The alternating steel and aluminum simulate or mimic the sensor component 40 of FIGS. 1-2. The sensor component 240 is formed adjacent the splines 222 of the drum 212. The teeth 234 of the drum 212 are formed by a portion of the splines 222.

As shown, a seating surface 254 is formed on an inner surface of the secondary drum 244 to engage with the gear 216 and is configured to prevent the gear 216 from moving axially beyond the seating surface 254. The secondary drum 244, the gear 216, and the plate 214 form the gear assembly.

To assemble the torque transmitting assembly 210, the parts (the drum 212, the plate 214, the gear 216, and the secondary drum 244) are formed by their respective processes. The plate 214 is received on the shoulder 238 of the gear 116 and is coupled to the gear 216 by a weld, for example. The plate 214 and the gear 216 are received in the secondary drum 244. The splines 246 of the gear 216 engage with and intermesh with the splines 250 formed on the inner surface of the secondary drum 244. The drum 212 is coupled to the secondary drum 244 by the castle joint or intermeshing of the teeth 228, 234. The castle joint is spaced from the plate 214 and the gear 216 at an intermediate portion of the torque transmitting assembly 210 and forms the sensor component 240. A groove 243 is formed along the castle joint formed by the intermeshing of the teeth 228, 234 for receiving a snap ring to facilitate retaining the drum 212 to the secondary drum 244.

Advantageously, the torque transmitting assembly 210 minimizes manufacturing and assembly costs. The sensor component 240 as the intermeshing of teeth 228, 234 effects the same results as the sensor component 40 of FIGS. 1-2 without employing a separate component. The secondary drum 244 formed from steel facilitates maximized strength in engaging the gear 216. Additionally, the torque transmitting assembly 210 facilitates desired compliance and flexing of the gear 216 while minimizing wear.

Figure 7:
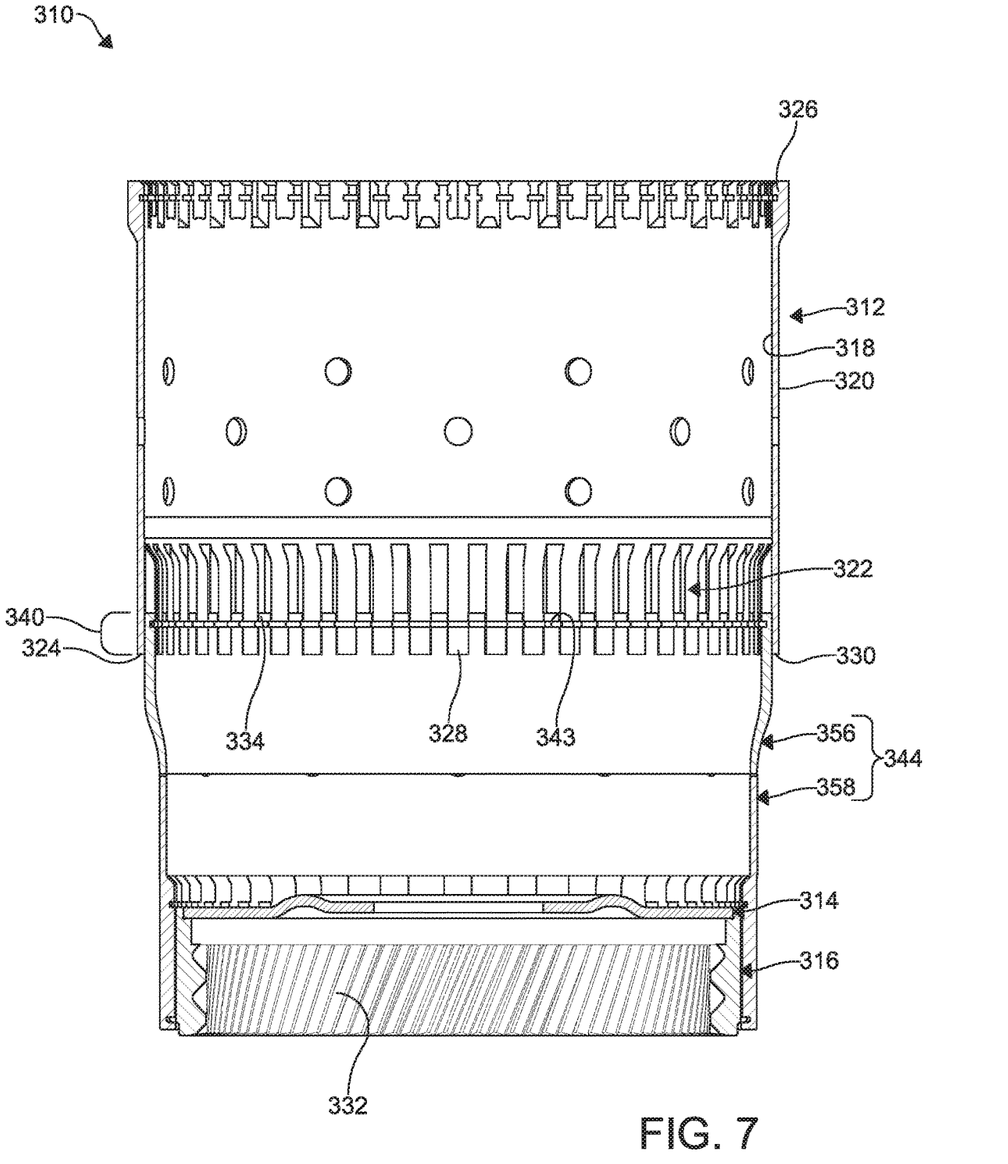
FIG. 7 is an assembled cross-sectional view of a torque transmitting assembly according to another embodiment of the disclosure.
Figure 8:
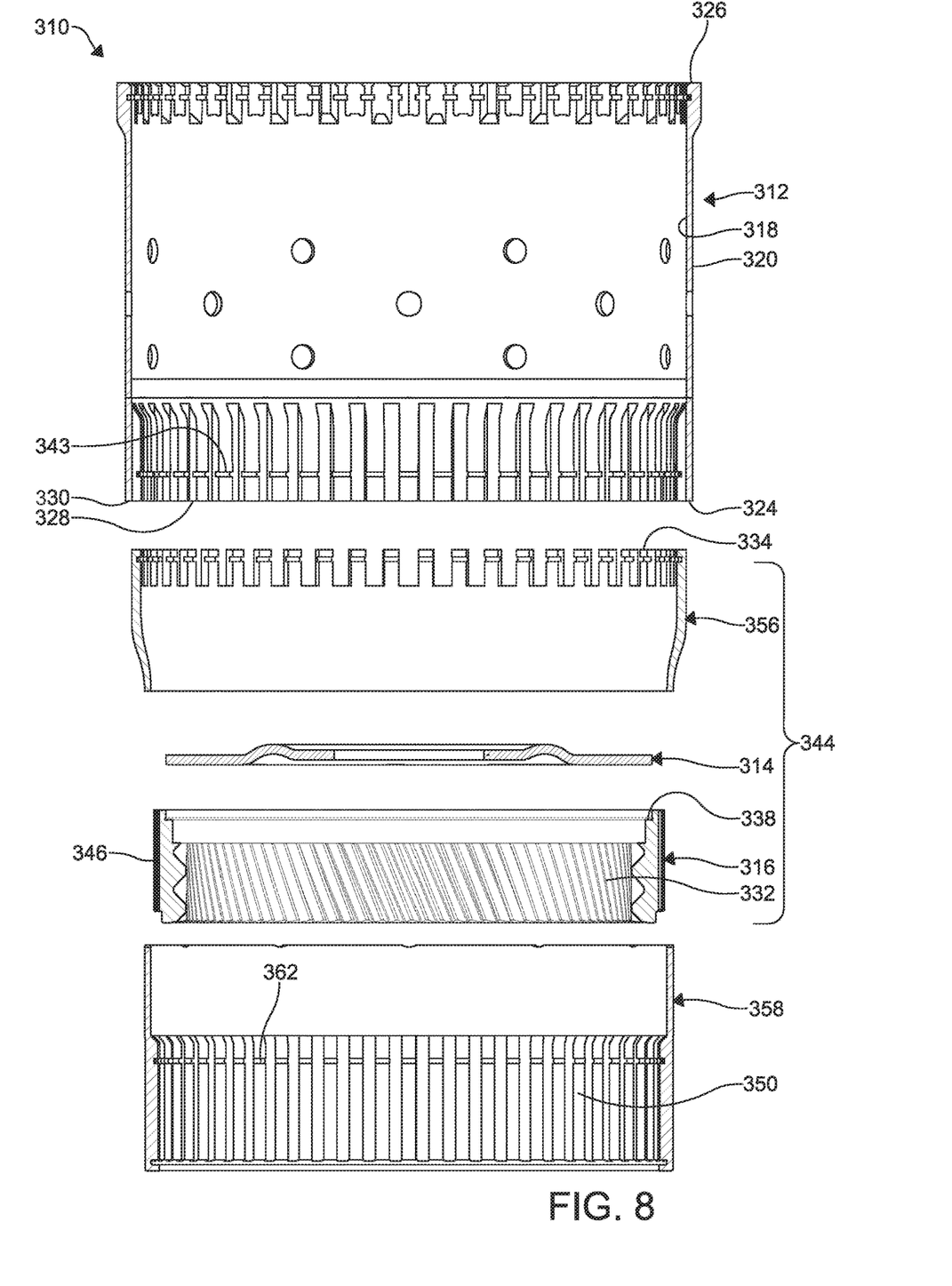
FIG. 8 is an exploded cross-sectional view of the torque transmitting assembly according to FIG. 7.

FIGS. 7-8 illustrate a torque transmitting assembly 310 according to another embodiment of the disclosure. Features similar to the torque transmitting assemblies 10, 110, 210 of FIGS. 1-6 are annotated with the same reference numeral but with a leading "3". The torque transmitting assembly 310 of FIGS. 7-8 is substantially similar to the torque transmitting assembly 210 of FIGS. 5-6 including the secondary drum 344. However, the secondary drum 344 is formed from a first component 356 and a second component 358, wherein the first component 356 includes the teeth 334 intermeshing with the teeth 328 of the drum 312 and the second component 358 includes the splines 350 for engagement with the splines 346 formed on the outer surface of the gear 316. The first component 356 is coupled to the second component 358 by a coupling means such as a weld, interference fit, or any other coupling means as desired. The secondary drum 344, the gear 316, and the plate 314 form the gear assembly.

To assemble the torque transmitting assembly 310, the parts (the drum 312, the plate 314, the gear 316, and the secondary drum 344) are formed by their respective desired processes. The plate 314 is received on the shoulder 338 of the gear 316 and is coupled to the gear 316 by a weld, for example. As illustrated, an annular groove 362 can be formed in the secondary drum 344 at the splines 350 to receive a snap ring to facilitate retaining the plate 314, the gear 316, to the secondary drum 344. The plate 314 and the gear 316 are received in the second component 358 of the secondary drum 344. The splines 346 of the gear 316 engage with and intermesh with the splines 350 formed on the inner surface of the second component 358 of the secondary drum 344. The drum 312 is coupled to the first component 356 of the secondary drum 344 by the castle joint or intermeshing of the teeth 328, 334. The castle-type joint forms the sensor component 340. The groove 343 is formed along the intermeshed teeth 328, 334 castle-type joint for receiving a snap ring to facilitate retaining the drum 312 to the secondary drum 344.

Advantageously, the torque transmitting assembly 310 minimizes manufacturing and assembly costs. The sensor component 340 as the intermeshing of teeth 328, 334 effects the same results as the sensor component 40 of FIGS. 1-2. The secondary drum 344 formed from steel facilitates maximized strength in engaging the gear 316. Additionally, the torque transmitting assembly 310 facilitates desired compliance and flexing of the gear 316 while minimizing wear.

Figure 9:
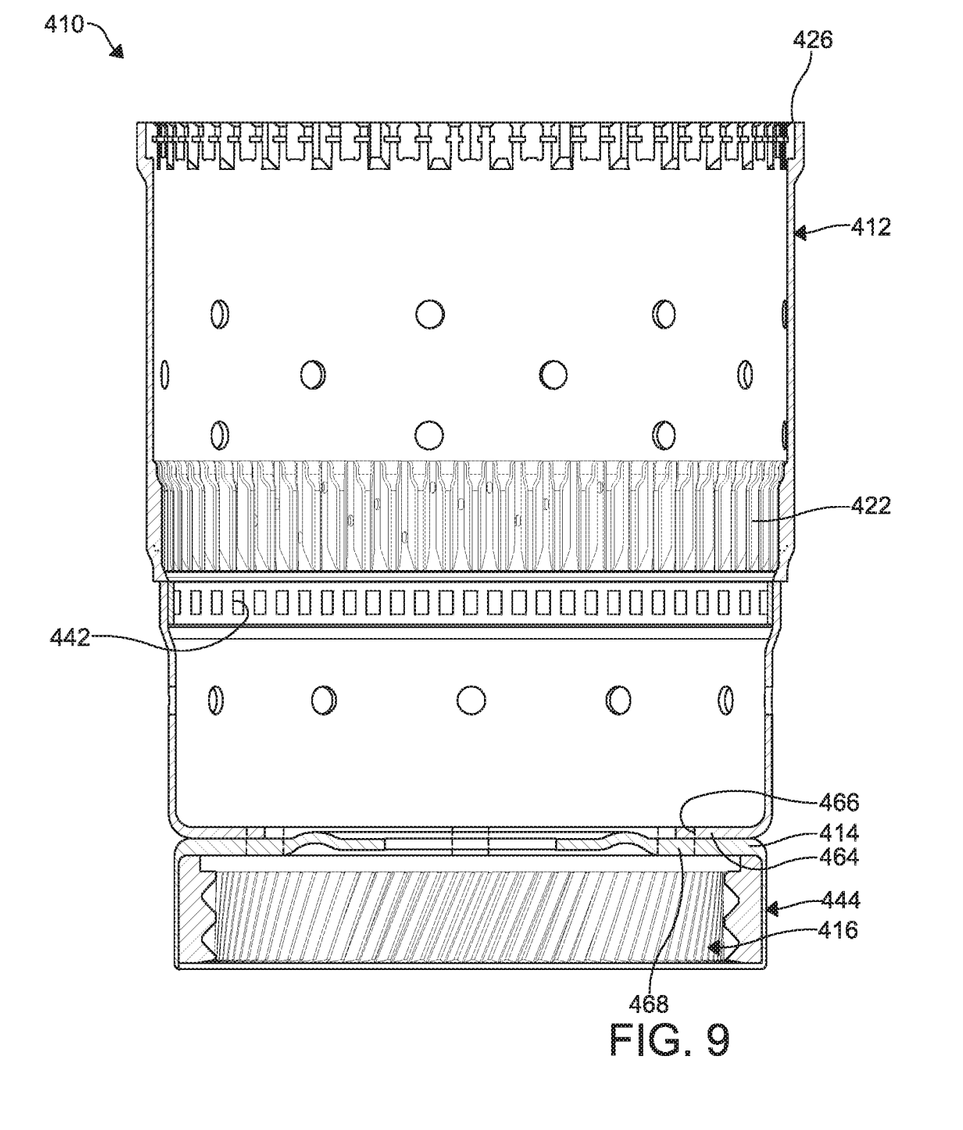
FIG. 9 is an assembled cross-sectional view of a torque transmitting assembly according to yet another embodiment of the disclosure.
Figure 10:
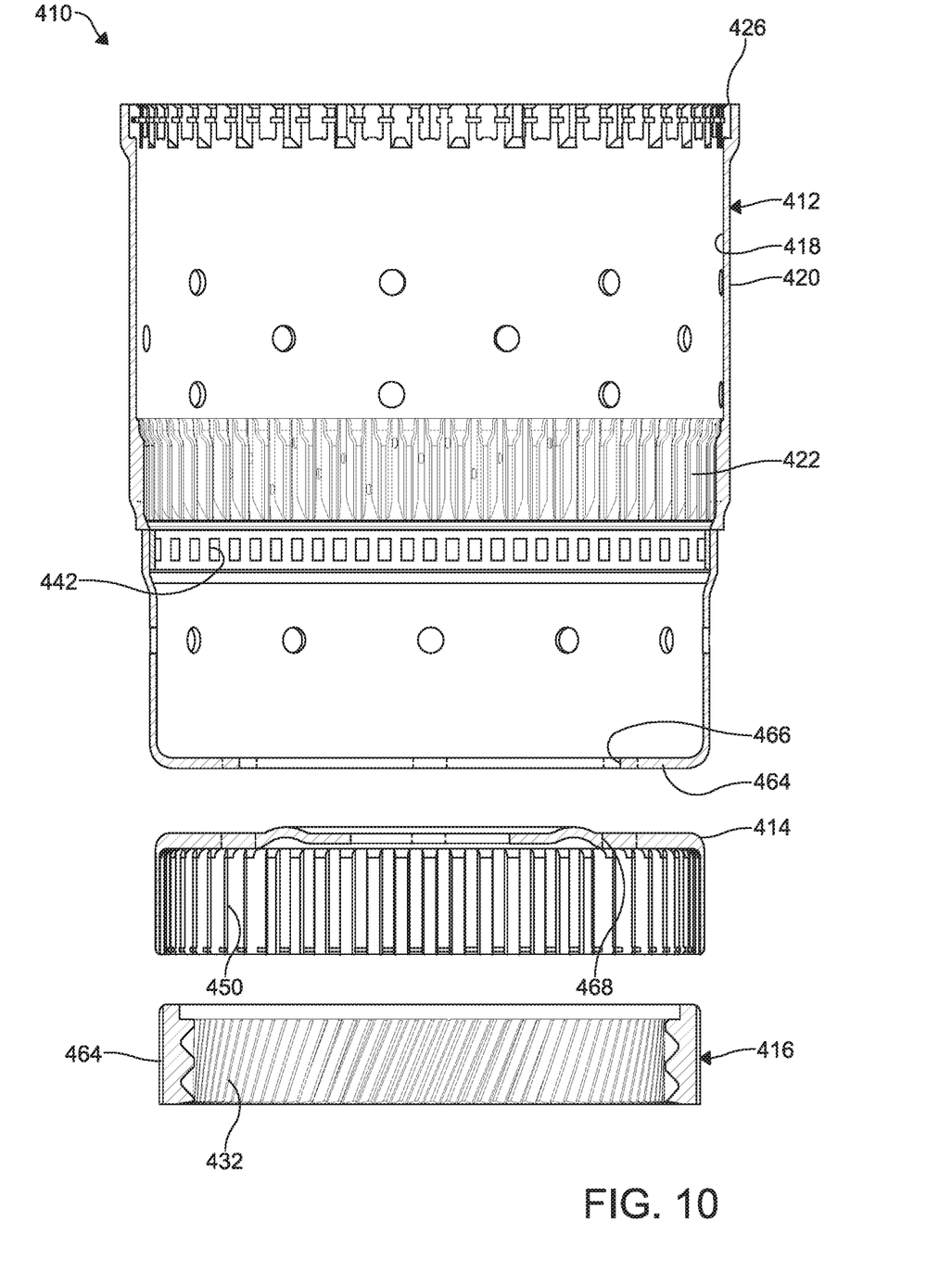
FIG. 10 is an exploded cross-sectional view of the torque transmitting assembly according to FIG. 9.

FIGS. 9-10 illustrate a torque transmitting assembly 410 according to another embodiment of the disclosure. Features similar to the torque transmitting assemblies 10, 110, 210, 310 of FIGS. 1-8 are annotated with the same reference numeral but with a leading "4". The torque transmitting assembly 410 of FIGS. 9-10 is substantially similar to the torque transmitting assembly 10, 110 of FIGS. 1-4 including the secondary drum 444. However, the plate 414 is integrally formed with the secondary drum 444 and includes apertures 466 formed therethrough. The drum 412 includes a flange 464 disposed at the first end 424 thereof. The flange 464 includes apertures 468 formed therethrough corresponding to the apertures 466 formed in the plate 414. The secondary drum 444 integrally formed with the plate 414 and the gear 416 form the gear assembly.

To assemble the torque transmitting assembly 410, the parts (the drum 412, the gear 416, and the secondary drum 444 integrally formed with the plate 414) are formed by their respective processes. The gear 416 is received in the secondary drum 444. The drum 412 is coupled to the secondary drum 444 via coupling means such as bolts, screws, pins or the like, received through the aligning apertures 466, 468. Although, it is understood other coupling means such as riveting and welding can be employed to couple the drum 412 to the secondary drum 444.

Advantageously, the torque transmitting assembly 410 minimizes a required weld or machining of the plate 414 to the gear 416, which minimizes assembly steps and manufacturing costs. The secondary drum 444 formed from steel facilitates maximized strength in engaging the gear 416. Additionally, the torque transmitting assembly 410 facilitates desired compliance and flexing of the gear 416 while minimizing wear.

While aluminum and steel are advantageous for certain components of the torque transmitting assembly 10, 110, 210, 310, 410 for various reasons, it is understood that other materials can be employed if desired without departing from the scope of the disclosure.

Furthermore, while five embodiments illustrating various embodiments are shown in FIGS. 1-10, it should be understood the features and certain configurations can be interchangeable between the various embodiments. For example, the sensor component 40 configured as an annular ring, such as shown in FIGS. 1-2, can be employed with any of the various embodiments. In another example, the intermeshing of teeth 228, 234 to form the sensor component 240, such as shown in FIGS. 5-6, can be employed with any of the various embodiments. In a further example, the configurations of gear 16, 116, 216, 316, 416 in relation to the drum 12, 112, 212, 312, 412 and the secondary drum 144, 244, 344, 444 can be employed with any of the various embodiments.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A torque transmitting assembly comprising:
   a first drum having a plurality of teeth formed at an end thereof;
   a gear assembly axially aligning with the first drum and having a plurality of teeth intermeshing with the plurality of teeth of the drum, the gear assembly including an annular gear and a plate axially aligning with the gear; and
   a sensor component annularly extending on an inner surface of the first drum, wherein the sensor component is a ring having a plurality of windows, and wherein the sensor component is captured by the drum during a flow forming process.

2. The torque transmitting assembly of claim 1, wherein the first drum is aluminum and the gear is steel.

3. The torque transmitting assembly of claim 1, wherein the plate is received on a shoulder formed on an inner surface of the gear.

4. The torque transmitting assembly of claim 1, wherein the plurality of teeth of the gear assembly is formed on an end of the gear.

5. The torque transmitting assembly of claim 1, wherein the gear assembly further includes a second drum receiving the gear and the plate.

6. The torque transmitting assembly of claim 5, wherein the plurality of teeth of the gear assembly is formed on an end of the second drum.

7. The torque transmitting assembly of claim 5, wherein the second drum is steel.

8. A torque transmitting assembly comprising:
   a first drum having a plurality of splines formed on an inner surface intermediate a first end and a second end thereof and one of a flange and a plurality of teeth formed at the first end thereof; and
   a gear assembly coupled to the first end of the first drum and engaging the one of the flange and the plurality of teeth of the first drum, the gear assembly including a second drum receiving an annular gear and a plate axially aligning with the gear, wherein the first drum is aluminum, the second drum is steel, the gear is steel, and the plate is steel, and wherein the plate is integrally formed with the second drum.

9. The torque transmitting assembly of claim 8, wherein the flange is formed at the first end of the first drum and the plate is coupled to the flange of the first drum.

10. A torque transmitting assembly comprising:
    an aluminum drum having a plurality of teeth formed at an end thereof; and
    a gear assembly axially aligning with the drum and coupled to the end of the drum, the gear assembly including a steel drum, an annular steel gear, and a steel plate, the steel drum having a plurality of teeth intermeshing with the plurality of teeth of the aluminum drum and a plurality of splines formed on an inner surface thereof, the steel gear having a plurality of splines formed on an outer surface thereof engaging the plurality of splines of the steel drum, the plate engaging at least one of an inner surface of the steel gear and an inner surface of the steel drum.

11. A torque transmitting assembly comprising:
    a first drum having a plurality of teeth formed at an end thereof; and
    a gear assembly axially aligning with the first drum and having a plurality of teeth intermeshing with the plurality of teeth of the drum, the gear assembly including an annular gear, a plate axially aligning with the gear, and a second drum receiving the gear and the plate, wherein the second drum includes a plurality of splines formed on an inner surface thereof and the gear includes a plurality of splines formed on an outer surface thereof engaging the plurality of splines formed on the inner surface of the second drum.

12. The torque transmitting assembly of claim 11, wherein the plate includes a plurality of splines formed on an outer surface thereof, the plurality of splines formed on the plate engaging the plurality of splines formed on the inner surface of the second drum.

13. A torque transmitting assembly comprising:
    a first drum having a plurality of teeth formed at an end thereof; and
    a gear assembly axially aligning with the first drum and having a plurality of teeth intermeshing with the plurality of teeth of the drum, the gear assembly including an annular gear, a plate axially aligning with the gear, and a second drum receiving the gear and the plate, wherein the second drum is formed from a first component coupled to a second component.

\* \* \* \* \*